United States Patent
Maeda et al.

[11] Patent Number: 6,145,847
[45] Date of Patent: Nov. 14, 2000

[54] METAL LAMINATE GASKET

[75] Inventors: Shu Maeda; Hiroshi Sasaki; Ichirou Naitou, all of Yamato, Japan

[73] Assignee: Nippon Reinz Co., Ltd., Kanagawa-prefecture, Japan

[21] Appl. No.: 09/005,382

[22] Filed: Jan. 9, 1998

[30] Foreign Application Priority Data

Jan. 13, 1997 [JP] Japan ................................. 9003636
Jan. 13, 1997 [JP] Japan ................................. 9003638

[51] Int. Cl.⁷ ............................... F16J 15/08; F02F 11/00
[52] U.S. Cl. ........................................................... 277/593
[58] Field of Search ........................... 277/592, 593, 277/594, 596, FOR 248

[56] References Cited

U.S. PATENT DOCUMENTS

| | | | |
|---|---|---|---|
| 3,794,333 | 2/1974 | Czernik et al. . | |
| 4,140,323 | 2/1979 | Jacobs . | |
| 4,397,472 | 8/1983 | Czernik ................................ | 277/592 |
| 4,428,593 | 1/1984 | Pearlstein .............................. | 277/596 |
| 4,462,615 | 7/1984 | Ulmer et al. .......................... | 277/592 |
| 4,519,619 | 5/1985 | Doyle .................................... | 277/594 |
| 4,676,515 | 6/1987 | Cobb ..................................... | 277/592 |
| 4,721,315 | 1/1988 | Ueta . | |
| 4,799,695 | 1/1989 | Yoshino . | |
| 4,830,698 | 5/1989 | DeCore et al. ....................... | 277/596 |
| 4,896,891 | 1/1990 | Udagawa .............................. | 277/593 |
| 5,122,214 | 6/1992 | Zurfluh et al. ....................... | 277/596 |
| 5,150,910 | 9/1992 | Udagawa .............................. | 277/592 |
| 5,490,681 | 2/1996 | Plunkett et al. ...................... | 277/592 |
| 5,582,415 | 12/1996 | Yoshida et al. . | |

FOREIGN PATENT DOCUMENTS

| | | |
|---|---|---|
| 2849018 | 5/1980 | Germany . |
| 2-59361 | 4/1990 | Japan . |
| 09210205 | 8/1997 | Japan . |

*Primary Examiner*—Anthony Knight
*Assistant Examiner*—John L. Beres
*Attorney, Agent, or Firm*—Merchant & Gould P.C.

[57] ABSTRACT

The invention relates to a metal laminate gasket for use in an internal combustion engine, such as a cylinder head gasket. The gasket includes at least two metal plates, each having at least one hole to be sealed and a plurality of bolt holes. In one embodiment, the first metal plate includes an annular bead portion surrounding the at least one hole. The second metal plate is arranged to cover the recess of the bead portion of the first metal plate. A rigid synthetic resin layer fills a part of the recess of the bead portion of the first metal plate. The rigid synthetic resin layer serves to increase the thickness of the lamination of the gasket to enhance the sealing effect and serves to limit the degree of compression of the bead portion when the gasket is compressed. The rigid synthetic resin layer is covered with the first metal plate and the second metal plate, and thus does not come into direct contact with the joint surfaces. Accordingly, there is no fear that the rigid synthetic resin layer may be worn away by friction with the joint surface because of vibration, or thermal expansion or contraction of the joint surfaces during the operation of the engine. The rigid synthetic resin layer may be formed on the surface of the second metal plate opposing said recess.

17 Claims, 6 Drawing Sheets

$h_1 > h_2$ $h_1 > h_2$ $h_1 > h_2$

METAL LAMINATE GASKET

BACKGROUND OF THE INVENTION AND RELATED ART STATEMENT

The present invention relates to a metal laminate gasket for use in an internal combustion engine, and in particular to a metal laminate gasket which comprises bead portion(s) for surrounding hole(s) such as combustion chamber hole(s) to be sealed, and element(s) which is/are disposed in said bead portion(s) to serve as stopper(s) for limiting the degree of compression of the bead portion(s).

A cylinder head gasket comprises a single or a plural number of metal plates each having combustion chamber hole(s) and bolt holes, in which at least one of the metal plates having bead portion(s) for surrounding and sealing the combustion chamber hole(s). The bead portion has a projection formed on one surface of the metal plate and a recess formed on the other side of the projection on the other surface of the metal plate. The "bead portion" referred to in the present specification has such a meaning as mentioned above throughout the present specification.

U.S. Pat. Nos. 4,799,695 and 4,721,315 disclose the provision of stopper portions inside the bead portions (on the side of the combustion chamber holes), said stopper portions being formed by turning back the peripheries of the combustion chamber holes of the metal plates, or by laminating shim plates, so as to serve to limit the degree of compression of the bead portions. When the gaskets are compressed between the joint surfaces of cylinder heads and the joint surfaces of cylinder blocks, the above stopper portions serve to limit the degrees of compression of the bead portions, thereby limiting the amplitude of repetitive compression and restoration of the bead portions due to gas pressure in the combustion chambers. Thus, the gaskets are prevented from losing sealing effects because of less resilience of the bead portions due to their creep relaxation and because of the damages such as cracks during a long period of use.

Japanese Utility Model Laid-Open Publication No. 2-59361 discloses that a stopper portion for limiting the degree of compression of a bead portion is provided in the recess of the bead portion. The stopper portion, for example, consists of a shaped wire of mild steel fixed in the recess of the bead portion. Thus, cyclic loads applied to the bead portion while an engine is driven are absorbed by the clearance between the bottom face of the shaped wire and a surface to be sealed (i.e., by deformation of the bead portion) and deformation of the shaped wire. This publication also discloses a flame coating layer stopper as an alternative of the shaped wire stopper, said flame coating layer stopper being deformed by bolt-tightening and repetitive loads.

U.S. Pat. No. 4,140,323 discloses a resilient elastomeric sealant material to be disposed in the recess of a bead portion. The elastomeric sealant material disposed prevents the bead portions from flattening out, and thus concentrates the sealing effect on the zones of the bead portions, when a gasket is compressed between a pair of confronting surfaces to be sealed. The elastomeric sealant material also fills in scratches or other imperfections on the pair of the confronting surfaces to be sealed or the gasket surface, thereby preventing leakage from such imperfections.

The assignee of the present invention has proposed the following in Japanese Patent Application No. 8-38787 filed on Jan. 31, 1996 (Japanese Laid-Open Publication No. 9-210205): the recesses of the bead portions for surrounding holes to be sealed, of a metal gasket are partially filled with a non-compressible and non-deformable rigid synthetic resin such as an epoxy resin, wherein the height of the resin layers are lower at parts of the bead portions close to the bolt holes and it is higher at parts thereof spaced farther from the bolt holes. The rigid synthetic resin layers filling the parts of the recesses of the bead portions serve as stoppers for limiting the degree of compression of the bead portions, and they also serve to thicken the gasket at its portions filled with the resin layer more than the other portions to thereby enhance the sealing effect. Further, the height of the rigid synthetic resin layers are varied in accordance with the distance from the bolt holes, so that sealing pressure is equalized on the zones around holes to be sealed such as combustion chamber holes.

In a gasket in which the recesses of bead portions are filled with a resilient elastomer sealant, the elastomer sealant layers are deformed when the bead portions are compressed, so that irregular stresses are applied to the bead portions. When such stresses are applied to the bead portions repetitively, there is a fear that damages such as cracks may occur in the bead portions. In the meantime, the gasket with the recesses of the bead portions filled with the non-compressible and non-deformable rigid synthetic resin has not such a fear.

The metal gasket of the above application, however, has a problem that, when the gasket is compressed between a pair of the joint surfaces of a cylinder head and a cylinder block to allow the rigid synthetic resin layers to come into contact with one of the joint surfaces, the rigid synthetic resin layers are worn down because of friction with the joint surface due to vibrations of the joint surfaces during the operation of an engine or due to the thermal expansion or contraction of the joint surface accompanying the start or stop of the operation of the engine. Thus, during a long period of use, the function of the rigid synthetic resin layers as the stoppers are lost and the gasket thickness increasing effect by the rigid synthetic resin layers decreases, resulting in a fear of decreasing the sealing pressure.

SUMMARY OF THE INVENTION

The present invention has been made to solve the foregoing problems. Objects of the present invention are, therefore, to eliminate the fear that the rigid synthetic resin layers formed in the recesses of bead portions surrounding holes to be sealed may be worn down by friction with the joint surfaces, and to eliminate the fear of lowering the function of limiting the degree of compression of the bead portions and also the fear of decreasing the sealing pressure because of the wear of the resin layers.

In order to achieve the above objects, a metal laminate gasket of the present invention comprises at least two metal plates each having at least one hole to be sealed and a plural number of bolt holes. The gasket comprises the first metal plate having bead portion(s) for surrounding hole(s) to be sealed, the second metal plate disposed to cover the recess(es) of the bead portion(s) of the first metal plate, and rigid synthetic resin layer(s) partially filled in the recess(es) of the first metal plate. The rigid synthetic resin layer is formed of a non-compressible and non-deformable synthetic resin which is not substantially compressed or substantially deformed under a compression stress, such as an epoxy resin, thermoset polyimide resin, polyamide-imide resin and silicon resin, and it is preferably formed of a thermocured epoxy resin. Examples of epoxy resins include various epoxy resins of bis-phenol A type, novolak type, aliphatic type, hydantoin type, isocyanate type and the like. Examples of hardeners for the epoxy resins include amines, hydrazines, acid anhydrides, imidazoles and the like. These agents can be used alone or in combination. Inorganic fillers such as clay, talc and silica are favorably admixed with those resins.

The rigid synthetic resin layer(s) is not always formed in the recess(es) of the bead portion(s) of the first metal plate, but the resin layer(s) may be formed on the surface of the second metal plate at position(s) opposing the recess(es) of the bead portion(s) of the first metal plate so as to annularly surround hole(s) to be sealed.

The rigid synthetic resin layer(s) serves as stopper(s) to limit the degree of compression of the bead portion(s) when the gasket is compressed. The amplitude of repetitive compression and restoration of the bead portion(s) is therefore limited, so that less resilience due to creep relaxation and damages such as cracks can be prevented from occurring in the bead portion(s) during a long period of use. Further, the thickness of the gasket is increased at portion(s) on which the synthetic resin layer(s) is formed more than other portions of the gasket, thereby enhancing the sealing effect. The thickness of the gasket referred to herein means the sum of the respective thickness of the metal plates laminated, the thickness (height) of the rigid synthetic resin layer and the like.

According to the present invention, the rigid synthetic resin layer(s) is covered with the metal plate(s) constituting the gasket, and it does not come into contact with any of the joint surfaces of a cylinder head, cylinder block and the like. Therefore, there is no fear that the synthetic resin layer(s) may be worn away by friction with the joint surface because of vibration of the joint surface during operation of the engine, or because of thermal expansion or contraction of the joint surface accompanying the start or stop of the operation of the engine. Therefore, there is also no fear that the function of the stopper portion(s) is lost by the wear of the rigid synthetic resin layer(s), nor fear that the gasket thickness increasing effect of the synthetic resin layer(s) decreases to decline the sealing effect of the gasket.

DETAILED DESCRIPTION OF THE PREFERRED EMBODIMENTS

Figure 1:
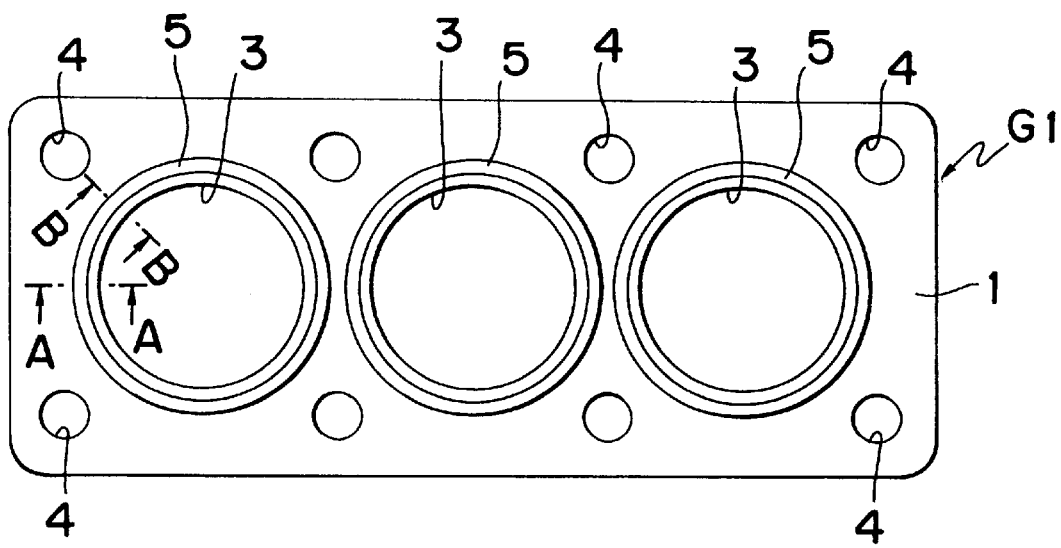
FIG. 1 is a plan view of a cylinder head gasket as a first embodiment of a metal laminate gasket of the present invention, in which sealing materials (denoted by numeral 7 in FIG. 2) are not shown for simplicity of the drawing.
Figure 2:
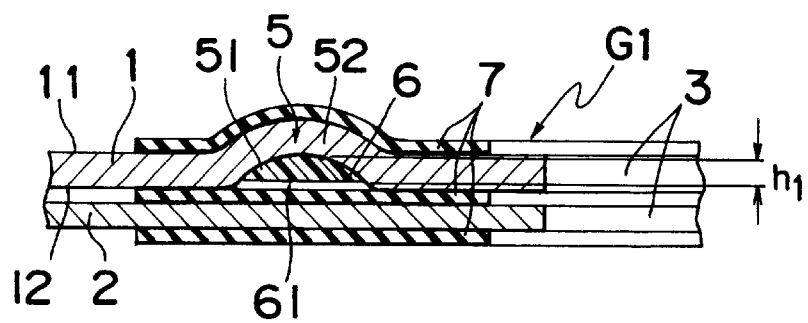
FIG. 2 is a sectional view taken along the line A—A in FIG. 1.
Figure 3:
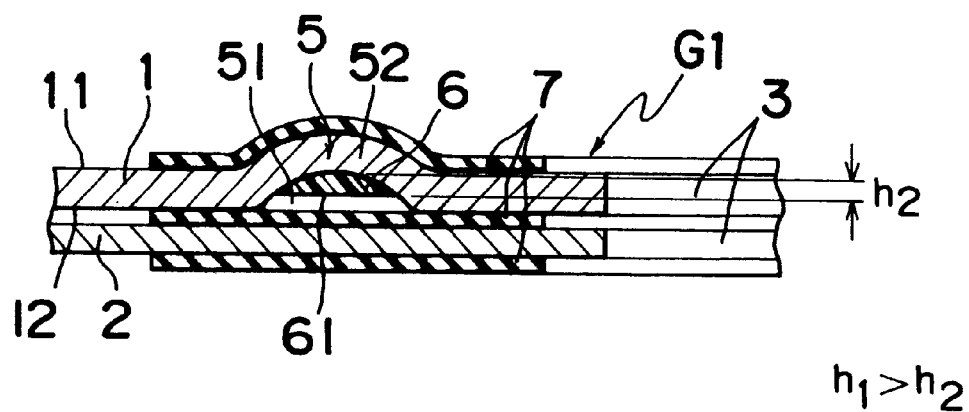
FIG. 3 is a sectional view taken along the line B—B in FIG. 1.

With reference to FIGS. 1 to 3, G1 represents a cylinder head gasket as the first embodiment of the metal laminate gasket of the present invention. The gasket G1 comprises first and second metal plates 1 and 2 of steel, stainless steel or the like, said first and second metal plates 1 and 2 each having combustion chamber holes 3 in conformity with the holes of the combustion chamber of an engine, and bolt holes 4 for inserting bolts for use in tightening the cylinder head to a cylinder block.

The first metal plate 1 comprises bead portions 5 for surrounding the combustion chamber holes 3. Each bead portion 5 has a projection 52 formed on one surface 11 of the first metal plate 1 and a recess 51 formed on the other side of the projection 52 on the other surface 12. The second metal plate 2 is formed in flat with no bead portion around the combustion chamber holes 3, and it is arranged to cover the recesses 51 on the other surface of the first metal plate 1.

Each of the recesses 51 of the annular bead portions 5 of the metal plate 1 is partially filled with a rigid synthetic resin, i.e., a non-compressible and non-deformable synthetic resin which is not substantially compressed or deformed under a stress, such as an epoxy resin. This rigid synthetic resin layer 6 is easily formed by applying or charging a liquid coating material such as an epoxy resin to or into the recesses 51 and setting it hard.

The height of the rigid synthetic resin layer may be almost constant in the entire area of each recess 51. However, in the gasket G1, the height of the rigid synthetic resin layer 6 is adjusted in accordance with the distance from the bolt hole 4 in order to uniform sealing pressure around the periphery of the combustion chamber hole 3. Thus, the height $h_1$ of the resin layer 6 farther from the bolt hole 4 is designed to be higher than the height $h_2$ of the resin layer 6 nearer to the bolt hole as shown in FIGS. 2 and 3. For example, with respect to the depth of the recess of the bead portion of 80 to 200 μm, the height of the resin layer nearer to the bolt hole is specified within a range of 30 to 60 μm, while the height of the resin layer farther from the bolt hole is specified within a range of 70 to 190 μm, not exceeding the depth of the recess 51. It is, however, preferable that the height of the resin layer is selected to such a height at least 10 μm lower than the depth of the recess 51 so that the bead portion 5 can be surely deformed elastically around the entire periphery of the combustion chamber hole 3. The adjustment of the height of the rigid synthetic resin layer can be done in a comparatively easy manner: that is, a liquid coating material such as an epoxy resin is additionally screen-coated on only the portion at which the height of the resin layer should be higher; or its height can be adjusted by adjusting the application amount of the liquid coating material by the use of a dispenser, or by partial additional coating.

The adjustment of the height of the rigid synthetic resin layer 6 in accordance with the distance from the bolt hole can be done in the same manner as mentioned above even in a case where such adjustment is not described in the part of embodiments as will be described later.

Coatings of sealing material layers 7 are provided on the outer surface of the gasket, and one of the inner surfaces of the metal plates 1 and 2 which face to each other or are in contact with each other (on the surface of the metal plate 2 in the drawing). The sealing material layers 7 are formed of rubber or a synthetic resin having heat resistance and flexibility in a thickness of 15 μm, for example. In the drawing, only the portion on which the bead portion 5 is formed and its adjacent periphery are coated with the sealing material layer 7 but, alternatively, the outer and inner surfaces of the metal plate 2 may be entirely coated with sealing material layers 7.

The gasket G1 with the above construction is applied between the joint surfaces of the cylinder head and the cylinder block, and the gasket is compressed by tightening the bolts. At that time, each bead portion 5 is compressed resiliently in an limited amount, because the rigid synthetic resin layer 6 is formed in the recess 51 of each bead portion 5 and the bottom 61 of the resin layer 6 comes into tight contact with the inner surface of the metal plate 2 when the bolts are tightened. The synthetic resin layer 6 does not permit the bead portion 5 to be compressed more, thereby limiting the degree of compression of the bead portion 5. In other words, the rigid synthetic resin layer 6 formed in each recess 51 serves as a stopper so as to prevent the flattening of the bead portion 5 and also to limit the amplitude of repetitive compression and restoration of the bead portion due to gas pressure within the combustion chamber of the engine. Accordingly, the gasket can be prevented from losing its function because of less resilience due to creep relaxation and damages of the bead portions during a long period of use. The rigid synthetic resin layer increases the thickness of the gasket at its synthetic resin layer formed portion more than the other portion of the gasket, thereby increasing the sealing pressure at such a portion.

In the gasket G1 of the present invention, the bottom 61 of the rigid synthetic resin layer 6 formed in the recess 51 of the bead portion is covered with the second metal plate 2, and therefore does not come into contact with the joint surface of the cylinder head or the cylinder block. Thus, the rigid synthetic resin layer 6 has no fear to be worn away by friction with the joint surface of the cylinder head or the cylinder block because of vibration of the cylinder head or the cylinder block during the operation of the engine or because of expansion or contraction of the cylinder head or the cylinder block accompanying the start or stop of the operation of the engine.

Figure 4:
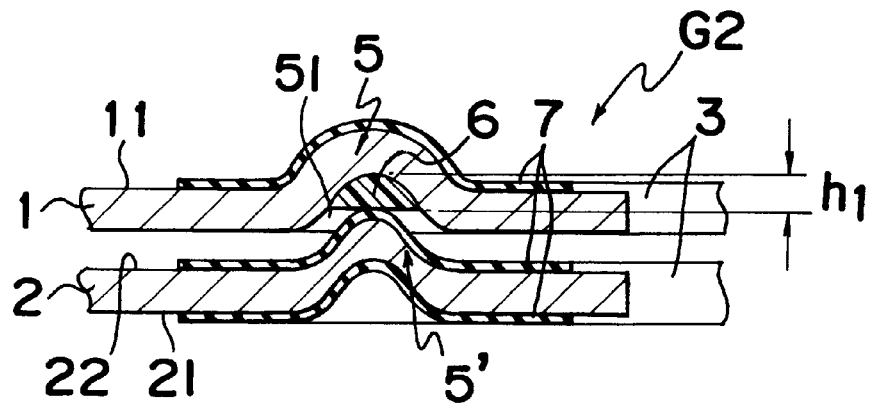
FIG. 4 is a sectional view similar to that of FIG. 2, showing a second embodiment of the present invention.
Figure 5:
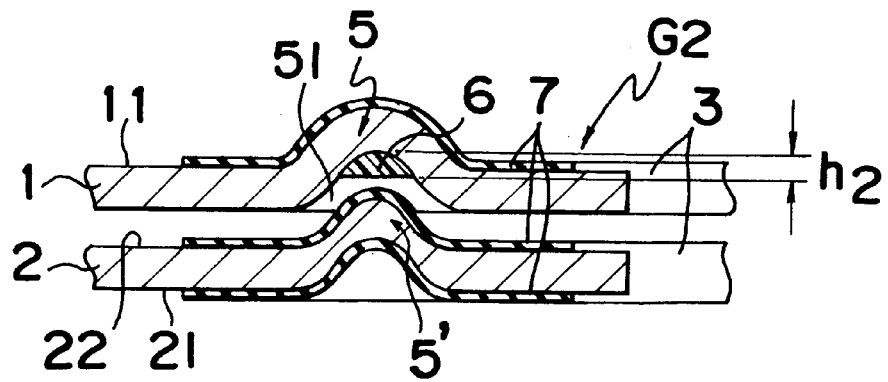
FIG. 5 is a sectional view similar to that of FIG. 3, showing the second embodiment.

With reference to FIGS. 4 and 5, the cylinder head gasket G2 as the second embodiment of the present invention comprises a first and second metal plates 1 and 2 of steel, stainless steel or the like, said first and second metal plates 1 and 2 each having combustion chamber hole(s) 3 and bolt hole(s) 4 as in the gasket G1. The first metal plate 1 has annular bead portion(s) 5 for surrounding the periphery of the combustion chamber hole(s) 3, and the recess 51 of each bead portion 5 is formed with a rigid synthetic resin layer 6 so as to fill a part of the depth of the recess 51. The filler of the rigid synthetic resin layer serves as a stopper for limiting the degree of compression of each bead portion 5, and it also serves to increase the thickness of the gasket at its portion(s) where the synthetic resin layer(s) are formed, thereby increasing sealing pressure.

The second metal plate 2 is so arranged as to cover the recess 51 of each bead portion 5 of the first metal plate 1. The second metal plate 2 has annular bead portion(s) 5' for surrounding the combustion chamber hole(s) 3 at position(s) corresponding to the bead portion(s) 5 of the first metal plate 1. Each bead portion 5' is projected in the same direction as each bead portion 5 of the first metal plate 1. Accordingly, the restoring forces of the bead portion 5 and the bead portion 5' are superposed to increase the restoring force of the bead portions as a whole, which leads to an increase in the sealing pressure resulting from the elastic deformation of the bead portion(s) when the gasket is compressed. The height and width of the bead portion 5' may be substantially equal to or may be different from those of the bead portion 5 of the first metal plate 1.

The rigid synthetic resin layer 6 is covered with the metal plates 1 and 2, and therefore is not worn away by friction with the joint surface of the cylinder head or the cylinder block.

Also in the gasket G2, the height of the rigid synthetic resin layer 6 is adjusted in accordance with the distance from the bolt hole in the same manner as in the gasket G1 in order to uniform the sealing pressure around the periphery of the combustion chamber hole 3. Thus, the height $h_1$ (see FIG. 4) of the synthetic resin layer at a position farther from the bolt hole 4 is designed to be higher than the height $h_2$ (see FIG. 5) thereof at a position nearer to the bolt hole 4.

As in the foregoing gasket G1, sealing material layers 7 of rubber or a synthetic resin having heat resistance and relative flexibility such as fluoro rubber and a silicone resin are applied on the outer surface 11 of the metal plate 1 and the outer surface 21 and the inner surface 22 of the metal plate 2. The sealing material layers 7 cover the imperfections such as the flaws, roughness and deformation of the joint surfaces of the cylinder head, the cylinder block, and of the surfaces of the metal plates 1 and 2 so as to enhance the sealing power of the gasket.

Figure 6:
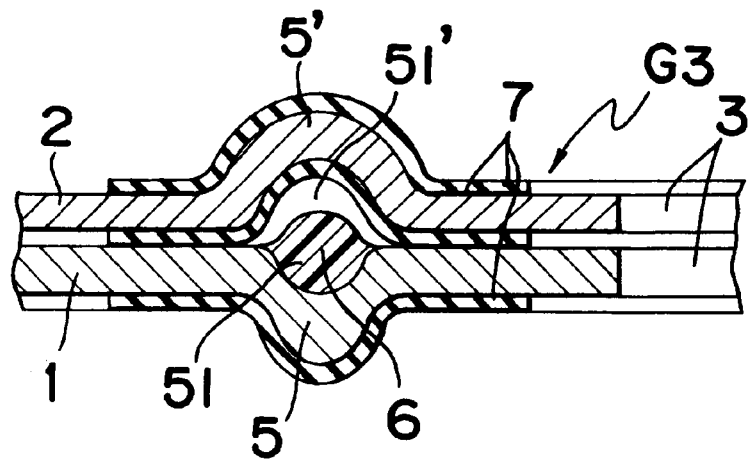
FIG. 6 is a sectional view similar to that of FIG. 2, showing a third embodiment of the present invention.

In the gasket G3 as the third embodiment of the present invention shown in FIG. 6, a first metal plate 1 is positioned on the side of a cylinder block (on the lower side of the drawing), and the first metal plate 1 has first bead portion(s) 5 for surrounding the periphery(ies) of combustion chamber hole(s) 3, projecting toward the cylinder block. A second metal plate 2 is positioned on the side of a cylinder head (on the upper side of the drawing) relative to the metal plate 1 so as to cover the recess 51 of each bead portion 5. The metal plate 2 has second bead portion(s) 5' at position(s) confronting the first bead portion(s) 5 of the metal plate 1. The bead portion 5' is projected in the opposite direction to the bead portion 5, i.e., in a direction on the side of the cylinder head. The recess 51' of the second bead portion 5' is disposed adjacent to the recess 51 of the first bead portion 5 so that both recesses can form a common space. A rigid synthetic resin layer 6 is formed in a part of the space. The synthetic resin layer 6 fills the recess 51 of the first bead portion 5 and is raised into the recess 51' of the second bead portion 5' so as to fill a part of the recess 51'. The height of the raised portion of the rigid synthetic resin layer 6 into the recess 51' is, for example, 40 to 150 μm. Thus, the entire height of the rigid synthetic resin layer 6 is the sum of the height of the above raised portion and the depth of the recess 51 of 80 to 200 μm.

When the gasket G3 is compressed between the joint surfaces of the cylinder head and the cylinder block, the rigid synthetic resin layer 6 in the recesses 51 and 51' serves to limit the degree of compression of both bead portions 5 and 5', and thus serves as a stopper for both bead portions 5 and 5'. The rigid synthetic resin layer 6 is enclosed in the bead portions 5 and 5', and therefore has no fear to be worn away by friction with the joint surface of the cylinder head or the cylinder block.

In the gasket G3, the metal plates 1 and 2 are arranged in such a back-to-back relation that the bead portion 5 and the bead portion 5' can be projected in the opposite directions to each other at the same position. The resilient restoration amounts of the bead portion 5 and the bead portion 5' are therefore added to each other, so that a large restoration amount can be obtained as a whole. Further, in the gasket G3 shown in FIG. 6, the bead portion 5' has substantially the same section as the bead portion 5 except that the width of the bead portion 5' is slightly larger than that of the bead portion 5, while there is no problem if the height of the bead portion 5' is different from that of the bead portion 5.

In case where the metal plate 2 is positioned on the side of the cylinder head so that its bead portion 5' is in contact with the joint surface of the cylinder head as shown in FIG. 6, it is usually preferable that the height of the bead portion 5' which comes into contact with the joint surface of the cylinder head which is deformed more than the cylinder block should be set higher than the height of the bead portion 5. In the drawing, numeral 7 denotes sealing material layers.

Figure 7:
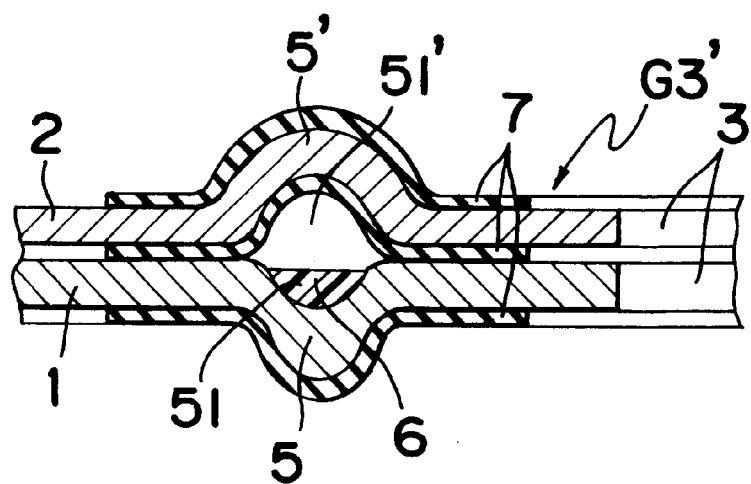
FIG. 7 is a sectional view similar to that of FIG. 2, showing a modification of the third embodiment of the present invention.

A gasket G3' as a modification of the third embodiment shown in FIG. 7 is differ from the above gasket G3 in that a rigid synthetic resin layer 6 is formed partially or fully in the recess 51 of the first bead portion 5, but is not raised into the recess 51' of the second bead portion 5'. The gasket G3' is constructed in the same manner as in the gasket G3 except for the above point. When the gasket G3' thus constructed is compressed between the joint surfaces of a cylinder head and a cylinder block, the top of the rigid synthetic resin layer is being projected into the recess 51' of the bead portion 5' of the second metal plate 2 as the bead portion 5 is being compressed. Thus, the rigid synthetic resin layer 6 serves to limit the degrees of compression of both bead portion 5 of the metal plate 1 and bead portion 5' of the metal plate 2, acting as a stopper for both. In the gasket G3', it is preferable that the width of the recess 51' is designed to be slightly larger than that of the recess 51 so that the rigid synthetic resin layer charged partially or fully in the recess 51 can be projected into the recess 51' smoothly as the bead portion 5 is being compressed.

As a further modification of the gasket G3', a rigid synthetic resin may be charged partially in the respective recesses 51 and 51' of the bead portions 5 and 5' to form respective rigid synthetic resin layers therein. In this case, the bead portions 5 and 5' are compressed to an extent that the respective bottoms of the rigid synthetic resin layers formed in the recesses 51 and 51' come into contact with each other, but the bead portions 5 and 5' are not compressed any more after that.

In the foregoing gaskets G1, G2, G3 and G3' as the first to third embodiments, a rigid synthetic resin is charged in the recesses of the bead portions for surrounding holes to be sealed, of the first metal plates to form rigid synthetic resin layers therein, and the second metal plates are arranged so as to cover the rigid synthetic resin layers formed in the recesses.

In gaskets G4 and G5 as the fourth and fifth embodiments as will be described hereinafter, second metal plates are arranged so as to cover the recesses of the annular bead portions of first metal plates as in the foregoing gaskets, but a rigid synthetic resin is not charged in the recesses of the bead portions of the first metal plates to form rigid synthetic resin layers therein. Instead, annular rigid synthetic resin layers so shaped and sized as to be set in the recesses of the first metal plates are formed on the inner surfaces of the second metal plates at positions confronting the recesses. The rigid synthetic resin layers thus formed similarly serve as stoppers for limiting the degree of compression of the bead portions of the first metal plates as in the rigid synthetic resin layers formed in the recesses of the foregoing gasket G1 and the like. They also increase the thickness of portions of the gaskets at which they are formed, more than other portions of the gasket, thereby producing effects of increasing sealing pressures. Also, in the gaskets G4 and G5, the rigid synthetic resin layers are covered with the first and second metal plates, and therefore have no fear that they may be worn away by friction with the joint surfaces of cylinder heads or cylinder blocks.

Figure 8:
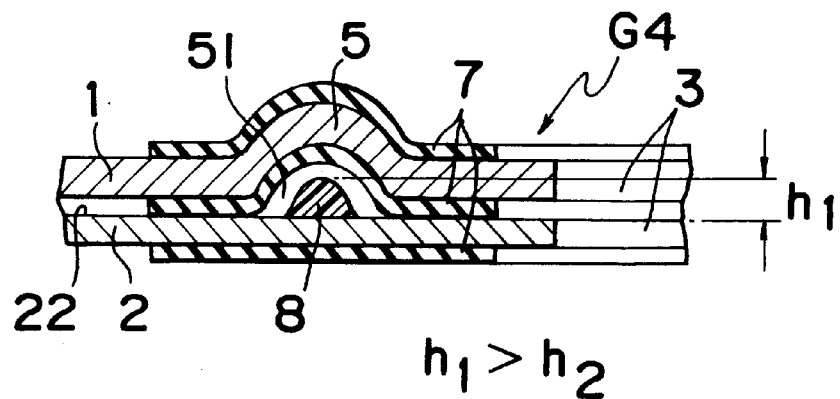
FIG. 8 is a sectional view similar to that of FIG. 2, showing a fourth embodiment of the present invention.
Figure 9:
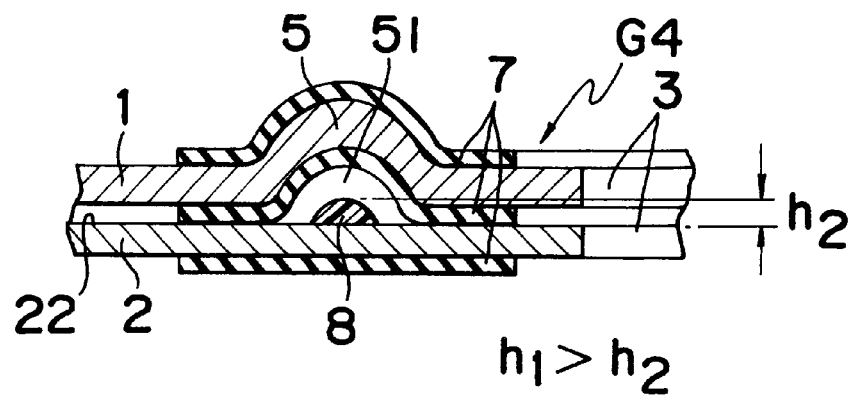
FIG. 9 is a sectional view similar to that of FIG. 3, showing the fourth embodiment of the present invention.

In the metal gasket G4 shown in FIGS. 8 and 9, a rigid synthetic resin layer 8 is formed in the shape of a ridge raised from the inner surface 22 of the second metal plate toward the recess 51. The bead portion 5, when compressed, comes into contact with the top of the rigid synthetic resin layer 8 and, thus supported by the rigid synthetic resin layer, the bead portion 5 is not compressed any more. For this reason, the height of the rigid synthetic resin layer 8 is specified to such that is smaller than the depth of the recess 51 (equal to the height of the bead portion 5). Further, in order to uniform the sealing pressure to be applied to the periphery of the combustion chamber hole 3, the height of the rigid synthetic resin layer 8 is adjusted in accordance with the distance from the bolt hole as in the gasket G2. Thus, the height $h_1$ (see FIG. 8) of the resin layer at a position farther from the bolt hole 4 is designed to be higher than the height $h_2$ (see FIG. 9) of the resin layer at a position nearer to the bolt hole. In the drawings, numeral 7 denotes sealing material layers.

Figure 10:
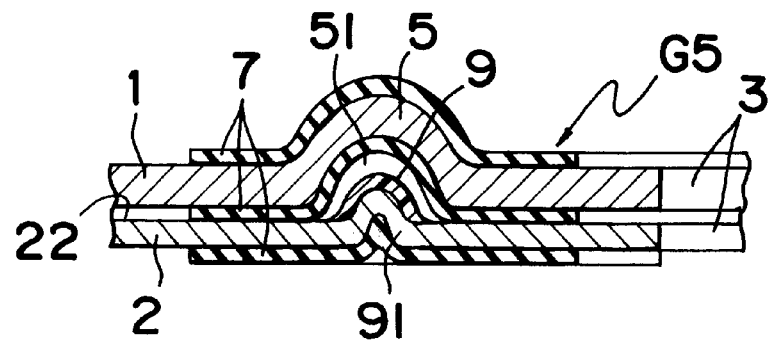
FIG. 10 is a sectional view similar to that of FIG. 2, showing a fifth embodiment of the present invention.

In the gasket G5 shown in FIG. 10, there is formed no rigid synthetic resin layer 8 that is formed in the shape of a ridge as in the above gasket G4, but there is formed a rigid synthetic resin layer 9 which is to coat the projection of a smaller bead portion 91 to raise toward recess 51, opposing the recess 51, on the inner surface 22 of the second metal plate 2. The height from the top of the resin layer 9 to the surface 22 is smaller than the depth of the recess 51. The bead portion 5, when compressed, comes into contact with the top of the rigid synthetic resin layer 9 to be supported by the same. The other construction of the gasket G5 is substantially the same as that of the gasket G4, except for the points as mentioned above.

Figure 11:
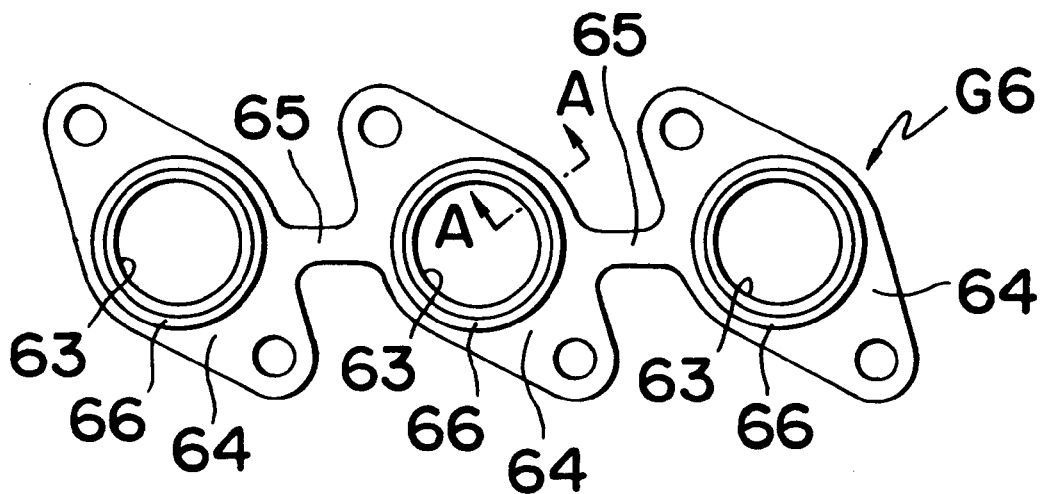
FIG. 11 is a plan view of an exhaust manifold gasket as a sixth embodiment of the present invention.
Figure 12:
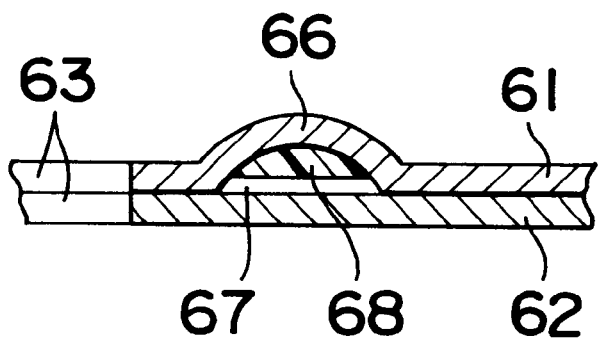
FIG. 12 is a sectional view taken along the line A—A in FIG. 11.

With reference to FIGS. 11 and 12, there is shown an exhaust manifold gasket G6 to which the present invention is applied. The exhaust manifold gasket is put in to seal between the joint surface of the mounting flanges for the branch pipes of an exhaust manifold which correspond to the exhaust ports of an engine, and the joint surface to which the exhaust ports of a side wall of a cylinder head are opened.

The gasket G6 comprises a first metal plate 61 and a second metal plate 62, and each metal plate has exhaust sealing portions 64 having exhaust holes 63 which correspond to the above exhaust ports of the engine, and connecting portions 65 for connecting the adjacent exhaust sealing portions. In each of the exhaust sealing portions, the first metal plate 61 has a bead portion 66 for surrounding the exhaust hole 63, and a rigid synthetic resin is charged in a part of the recess 67 of the bead portion 66 to form a rigid synthetic resin layer 68 therein. The second flat metal plate 62 is arranged to cover the recesses 67 and the rigid synthetic resin layers 68 formed therein so as not allow the rigid synthetic resin layers 68 to be worn away by friction with the joint surface.

The metal laminate gaskets of the present invention are not limited to the foregoing embodiments and their modifications, but they can be variously changed or modified to an extent that they are not beyond the spirit and scope of the present invention.

What is claimed is:

1. A metal laminate gasket for use in an internal combustion engine, including at least two metal plates each having at least one hole to be sealed and a plurality of bolt holes, said gasket comprising:

the first metal plate having at least one annular bead portion for surrounding said at least one hole, said annular bead portion having a projection formed on one surface of the first metal plate and a recess formed opposite the projection on an opposite surface of the first metal plate;

at least one rigid synthetic resin layer serving as a stopper, said layer is formed from a non-compressible and non-deformable synthetic resin so as to fill a part of the recess of said at least one bead portion of the first metal plate and to restrict the degree of resilient compression of said at least one bead portion of the first metal plate; and the second metal plate so arranged as to cover the recess of said at least one bead portion of the first metal plate and said at least one rigid synthetic resin layer formed in the recess.

2. A metal laminate gasket according to claim 1, wherein said second metal plate has a flat plane which confronts the recess of said at least one bead portion of the first metal plate.

3. A metal laminate gasket according to claim 1, wherein said second metal plate has at least one bead portion for surrounding said at least one hole at a position corresponding to said at least one bead portion of the first metal plate, said bead portion of the second metal plate projecting in the same direction as the bead portion of the first metal plate, and the top of said projection of the bead portion of the second metal plate being allowed to come into contact with the rigid synthetic resin layer when the gasket is compressed.

4. A metal laminate gasket according to claim 1, wherein the height of said rigid synthetic resin layer at a position farther from one of the plurality of bolt holes is higher than the height of said rigid synthetic resin layer at a position nearer to the one bolt hole.

5. A metal laminate gasket according to claim 1, wherein said rigid synthetic resin layer is formed from an epoxy resin.

6. A metal laminate gasket for use in an internal combustion engine, including at least two metal plates each having at least one hole to be sealed and a plurality of bolt holes, said gasket comprising:

the first metal plate having at least one first annular bead portion for surrounding said at least one hole, said first annular bead portion having a projection formed on one surface of the first metal plate and a recess formed opposite the projection on an opposite surface of the first metal plate;

the second metal plate having at least one second bead portion which surrounds said at least one hole at a position corresponding to said at least one first bead portion and has a projection raised in the opposite direction to the projection of the first bead portion, said second metal plate being arranged on the side of the recess of the bead portion of the first metal plate so that a recess of the second bead portion is disposed adjacent to the recess of the first bead portion so as to form a common space; and at least one rigid synthetic resin layer serving as a stopper, which is formed from a non-compressible and non-deformable synthetic resin so as to fill a part of said space and to restrict the degree of resilient compression of both bead portions of the first metal plate and the second metal plate.

7. A metal laminate gasket according to claim 6, wherein said synthetic resin layer is formed in either of the recesses of the first bead portion and the second bead portion so as to fill said recess.

8. A metal laminate gasket according to claim 6, wherein said rigid synthetic resin layer is so formed as to fill either of the recesses of the first bead portion and the second bead portion and to project into the other recess.

9. A metal laminate gasket according to claim 6, wherein the height of said rigid synthetic resin layer is higher at a position farther from one of the plurality bolt holes than at a position nearer to the one bolt hole.

10. A metal laminate gasket according to claim 6, wherein said rigid synthetic resin layer is formed from an epoxy resin.

11. A metal laminate gasket for use in an internal combustion engine, including at least two metal plates each having at least one hole to be sealed and a plurality of bolt holes, said gasket comprising:

the first metal plate having at least one bead portion for surrounding said at least one hole, said bead portion having a projection formed on one surface of the first metal plate and a recess formed opposite the projection on an opposite surface of the first metal plate;

the second metal plate arranged on the side of the recess of the bead portion of the first metal plate so as to cover said recess; and at least one rigid synthetic resin layer serving as a stopper, the layer is formed from a non-compressible and non-deformable synthetic resin on a surface of the second metal plate that confronts the recess of the bead portion of the first metal plate, said rigid synthetic resin layer being formed with such a shape and size so as to project into the recess of the first metal plate, and surrounding said at least one hole and restricting the degree of resilient compression of said at least on bead portion of the first metal plate.

12. A metal laminate gasket according to claim 11, wherein said rigid synthetic resin layer is formed on a flat surface of the second metal plate.

13. A metal laminate gasket according to claim 11, wherein said synthetic resin layer covers a projection that is formed on the second metal plate, whereby said layer is raised toward the first metal plate.

14. A metal laminate gasket according to claim 11, wherein the height of said rigid synthetic resin layer is higher at a position farther from one of the plurality of bolt holes than at a position nearer to the one bolt hole.

15. A metal laminate gasket according to claim 11, wherein said rigid synthetic resin layer is formed from an epoxy resin.

16. A metal laminate gasket according to claim 1, 6 or 11, wherein said at least one hole to be sealed is a combustion chamber hole in a cylinder head gasket.

17. A metal laminate gasket according to claim 1, 6 or 11, wherein said at least one hole to be sealed is an exhaust hole in an exhaust manifold gasket.

* * * * *